United States Patent
Gardell et al.

[19]

[11] Patent Number: 6,012,020

[45] Date of Patent: Jan. 4, 2000

[54] APPARATUS AND METHOD FOR MONITORING THE CONDITION OF SEPTIC TANKS

[76] Inventors: Steven E Gardell, 241 Farnum St., No. Andover, Mass. 01845; David L Gardell, 51 Richards Rd., Fairfax, Vt. 05454; Eric W Gardell, 102 Brothers Rd., Wapingers Falls, N.Y. 12590

[21] Appl. No.: 09/082,825

[22] Filed: May 21, 1998

[51] Int. Cl.[7] .................................................. G01S 15/00
[52] U.S. Cl. .............................. 702/50; 702/55; 367/87; 73/861.27
[58] Field of Search ................... 702/50, 55; 73/861.18, 73/861.25, 861.26, 861.27; 210/744, 747, 748, 170, 532.2, 203; 367/25, 87, 118, 131

[56] References Cited

U.S. PATENT DOCUMENTS

| | | | |
|---|---|---|---|
| 4,151,080 | 4/1979 | Zuckerman et al. | 210/59 |
| 4,230,578 | 10/1980 | Culp et al. | 210/86 |
| 4,319,998 | 3/1982 | Anderson | 210/86 |
| 4,619,768 | 10/1986 | Takahashi et al. | 210/739 |
| 4,680,475 | 7/1987 | Tansony et al. | 250/577 |
| 4,715,966 | 12/1987 | Bowman | 210/800 |
| 4,867,871 | 9/1989 | Bowne | 210/97 |
| 5,121,340 | 6/1992 | Campbell et al. | 364/509 |
| 5,186,821 | 2/1993 | Murphy | 210/86 |
| 5,408,874 | 4/1995 | Fleck, Sr. et al. | 73/290 V |
| 5,441,632 | 8/1995 | Charon | 210/170 |
| 5,563,845 | 10/1996 | Walsh | 367/7 |
| 5,698,775 | 12/1997 | Philip et al. | 73/64.55 |

*Primary Examiner*—Patrick Assouad
*Attorney, Agent, or Firm*—Mark P. White

[57] ABSTRACT

An electronic sensor for detecting when a septic tank reaches it's design capacity. The sensor uses a sonar transponder to measure the thickness of the three layers of material present in a properly operating septic tank. The sonar transponder is encapsulated in a environmentally sealed sensor assembly that floats in a self-orienting fashion at the top of the material contained in the septic tank. The sensor relays signals through a cable harness to a signal interpretation module located in a convenient indoor location. The signal interpretation module contains a digital signal processing (DSP) sub-system and an alarm sub-system. The DSP sub-system interprets the electronic signals from the sonar sensor resulting in a measurement of the relative volume of the material in septic tank as well as measures of the elevation of the bottom of the top (scum) layer and the top of the bottom (sludge) layer. Any of these measures may indicate that the tank has reached it's design capacity and should therefor be pumped. The alarm sub-system provides visual and audio alarms in a escalating fashion providing early warning of the impending need to service the tank.

16 Claims, 5 Drawing Sheets

APPARATUS AND METHOD FOR MONITORING THE CONDITION OF SEPTIC TANKS

FIELD OF THE INVENTION

The present invention relates to septic tank monitoring systems, and more specifically to such systems which provide for remote, electronic notification and control.

DESCRIPTION RELATIVE TO THE PRIOR ART

This invention improves on septic system design by monitoring the condition of the septic system, thereby providing timely indication of when it is necessary to empty the septic tank.

Septic systems consist of a septic tank in which wastes are collected, settled, and partially digested connected to a drain field which disperses the resulting "gray" water. In a properly operating septic system this gray water will contain little or no suspended solids. Furthermore, the presence of suspended solids in the gray water will, over time, result in the "failure" of the drainage field. This failure is a result of the field becoming clogged by the solids to such an extent that it can no longer absorb and disperse the gray water. This failure will typically be evidenced by pollution of ground and surface water. This can be an expensive, or in rare cases (typically for regulatory reasons), impossible, problem to fix.

A septic tank contains three biologically active zones. Waste matter enters the middle "liquid" zone. Heavy solids then settle to the bottom of the tank as sediment, or sludge, where they are further decomposed, although some of the sediment will not be biodegradable. Fats and other lighter suspended solids rise to the top of the tank forming a "cake", or "scum" which may also undergoes further decomposition. The design of the septic tank insure that, under normal operation, only material from fluid middle layer of enters the drainage field. The settlement rate in a tank is a function of the effective volume of the tank and rate of flow. In this case the effective volume of the tank is the volume of the middle liquid zone. This volume establishes a design capacity of the tank; that is, the ability of the tank to process the material flowing in at a particular rate. If the inflow rate exceeds a certain amount, the tank will be unable to process the material within fast enough to prevent failure of the system.

Distinguished from design capacity is the system capacity. The system capacity is the ability of a given system to continue to process more material. The system capacity reaches zero when one of several things happens:

a) particles of the sediment layer or cake layer are allowed to exit the system through the outflow; or b) the sediment layer and the cake layer approach each other to the point where little if any of the liquid layer remains.

During the course of normal operation of a septic system, both the bottom layer and the top layer are continually augmented by new material from the input waste stream. The material in both the top and the bottom layers undergoes anaerobic decomposition; thus the accumulation rate is substantially less than the rate at which corresponding solids are added to the system. Even with this decomposition, there is a gradual increase in the volume of both the top and the bottom layers over time. Periodically a septic tank must be pumped of these accumulated solids. Pumping is indicated when the volume of the central fluid portion is down to about 33% of the total of the three layers. Modern septic designs provide for several years between pumping; however eventually it will be required for any system being actively used. The interval between pumping is a function of the waste mix, volume of waste, and the effectiveness of the biological decomposition in the septic tank. Pumping may be indicated by 1) The absolute location of the top layer, 2) The absolute location of the bottom layer, or 3) A combination of these factors that reduced the volume of the central layer sufficiently. As the volume of solids increases in a tank, the effectiveness of the biological decomposition typically increases, resulting in a decreased rate of accumulation for a constant input rate. Taking into account all of these factors, it is virtually impossible to predict a priori when a tank will actually require pumping; experience indicates that the pumping interval can range from 2 to 15 years.

As the tank accumulates solids, the settlement effectiveness of the tank decreases resulting in increased discharge of solids into the gray water stream. Often the system has failed, in other words, begun to discharge substantial solids into the gray water, before there is a visible sign of failure to the operator. Typically, the first sign that the system operator (typically a homeowner) sees is an unsafe and unsanitary backup of waste material into the residence. By the time this happens, it is likely that substantial suspended solids have been released into the drain field. This "invisible" failure of septic systems is addressed by this invention.

The classical means of evaluating whether a septic system requires pumping is to remove the access cover to the septic tank and to measure the depth of each of the three layers by pushing a "flapper stick" into the tank. The flapper stick is configured so that it can be used to gauge the bottom of the cake. Direct observation of the stick after removal indicates the depth of the bottom sediment. This is an intrusive (landscaping is typically disturbed as the tank is opened) and unpleasant task. In practice it is seldom done by septic system operators. This invention improves on this process by providing effectively the same measurements in an automatic and on a continual basis.

A search of the prior art reveals a number of devices that measure or monitor septic tank contents in less desirable ways and devices that control the discharge effluent so as to limit the egress of undesirable particulate matter. The current invention represents an improvement over these previous devices since monitoring is continuous, non-invasive, automated, and provides an escalating level of feedback prior to any failure symptoms. It also improves on these devices by monitoring accumulation of solids at both the top and the bottom of the tank. A further improvement over some of the prior art is that the system described is practical for application in residential and anaerobic commercial waste disposal systems. A further improvement is that the device is easily installed in both new and existing septic tanks and that it does not interfere in any way with pumping operations.

The Patent to Wilkerson, U.S. Pat. No. 3,954,612 describes a mechanical device for measuring the height of the sludge in a septic tank. The device consists of a float assembly that is designed to ride at the interface between the fluid layer and the bottom sludge layer. The float has a mechanical arm that exits through the top of the septic tank allowing for direct observation of the sludge depth under the float. The current invention, an electronic device, is a marked improvement in reliability and accuracy over mechanical systems of the Wilkerson type.

The Patent to Anderson, U.S. Pat. No. 4,319,998 issued Mar. 16, 1982 describes a monitor for the gray water effluent. The monitor is inserted in-line between the septic tank and the drainage field. The device measures a total accumulation of suspended solids in the effluent stream and is designed so that a switch can be triggered resulting in remote notification. Anderson's patent is basically a mechanical monitoring system like Wilkerson's invention.

The Patent to Bowman, U.S. Pat. No. 4,715,966 issued on Dec. 29, 1987 describes a device intended to measure the thickness of sludge in a tank. The device consists of a float assembly that is designed to ride at the interface between the fluid layer and the bottom sludge layer. The float has a mechanical arm that exits through the top of the septic tank allowing for direct observation of the sludge depth under the float. This is another mechanical device similar to the Wilkerson Patent.

The Patent by Norcross, U.S. Pat. No. 5,421,995 describes a device for controlling the decanting of clarified liquid from a batch reactor. Norcross is not directly applicable for septic systems, as these systems are not batch reactors. The Norcross device consists of a mechanical assembly linked to the outlet. The assembly is essentially a hinge mechanism with one end fixed at the outlet and the other end floating. A key component of the invention is an electronic sensor suspended from the floating end that detects the sludge blanket. Norcross mentions the use of sonar as an alternative sensor, but does not develop this idea to any significant degree. It is believed that the optical sensor disclosed in Norcross does not operate reliably in the presence of solids or optically dense material in the septic tank which interfere with the system optics. The current invention does not suffer from these drawbacks.

SUMMARY OF THE INVENTION

It is the general object of this invention to provide an apparatus that indicates when a septic tank needs to be pumped. A specific object of this invention is to provide such an apparatus such that the apparatus can provide quantitative feedback allowing a septic system operator to assess on an ad-hoc basis how near the tank is to needing to be pumped. It is a further specific object of this invention that such monitoring be done without requiring opening of the tank (other than for the initial installation of the sensor assembly) and without the need for any physical measuring device to protrude from the tank.

According to one aspect of the invention, an apparatus is disclosed for monitoring the status of a septic tank of the type which contains a sludge level, liquid level, and a scum level. The invention includes means for sensing the location of the boundary between the sludge level and the liquid level, means for sensing the location of the boundary between the liquid level and the scum level, and means for calculating the status of the tank based on these locations. There are, furthermore, means for displaying said status, so that the user of the septic tank can determine whether the septic tank requires interventive action.

According to a second aspect of the invention, the septic tank has a design capacity, and the means for displaying further includes means for displaying whether or not the septic tank has reached its design capacity.

According to a third aspect of the invention the means for sensing further includes electronic means.

According to still another aspect of the invention electronic means further includes sonic means, and the means for displaying includes remote means. According to yet another aspect of the invention, there are also provided means to input septic tank dimensions into said means for calculating, as well as means to calculate the relative volumes of the three levels, and wherein the status further includes calculations based on these relative volumes.

According to still another aspect of the invention digital signal processing (DSP) means are provided for the calculations.

According to a final aspect of the invention the sonic means further includes free-floating means, self orienting means, and tethered means, and the means for displaying and means for inputting are implemented by computer.

BRIEF DESCRIPTION OF THE DRAWINGS

These, and further features of the invention, may be better understood with reference to the accompanying specification and drawings depicting the preferred embodiment, in which.

DETAILED DESCRIPTION OF THE PREFERRED EMBODIMENTS

The invention consists of a hermetically sealed self-orienting sonar sensor assembly that is joined by a wiring harness to an electronic signal interpretation module located at a convenient indoor location. The sonar sensing assembly floats near the top of the upper-most layer of material in a septic tank. It fires a sonar beam straight down towards the bottom of the tank. The resulting signal is processed by the signal interpretation module to yield the elevation of the top of the various layers. This information, in turn, is used to assess the volumes of the different components. This volumetric assessment provides an on-going measure of the remaining capacity of the tank for undissolved solids. These elevations are also used to assess whether either the top of the sedimentation layer or the bottom of the floating cake layer is approaching the bottom of either the output or the input baffles. If either of these conditions is true, then there is an emergency need pump the tank.

Figure 1:
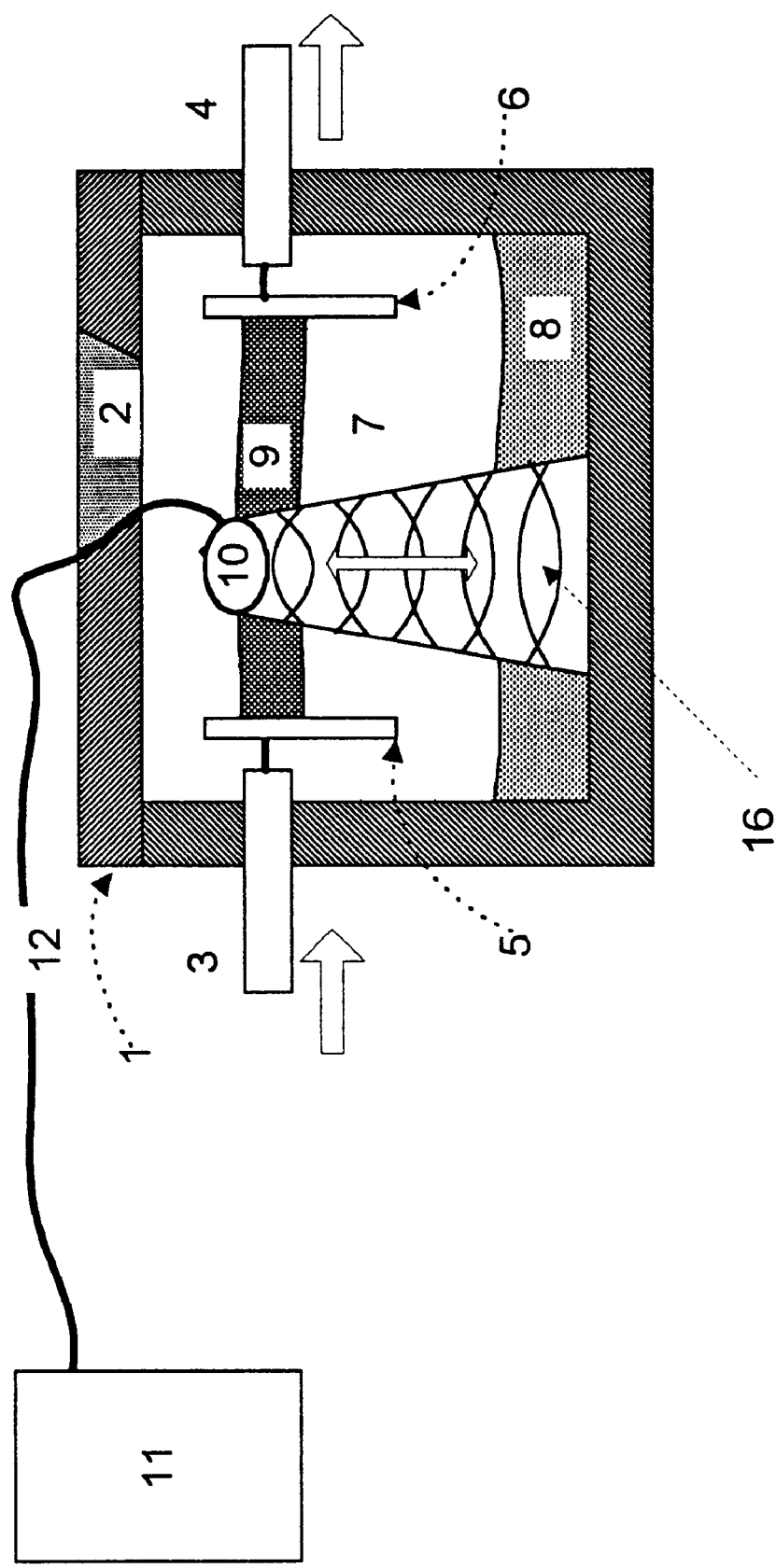
FIG. 1 depicts a cross-sectional view of a septic tank with the floating electronic septic sensor assembly installed, showing the three levels of material present in the tank, the sensor, and the wiring harness.
Figure 5:
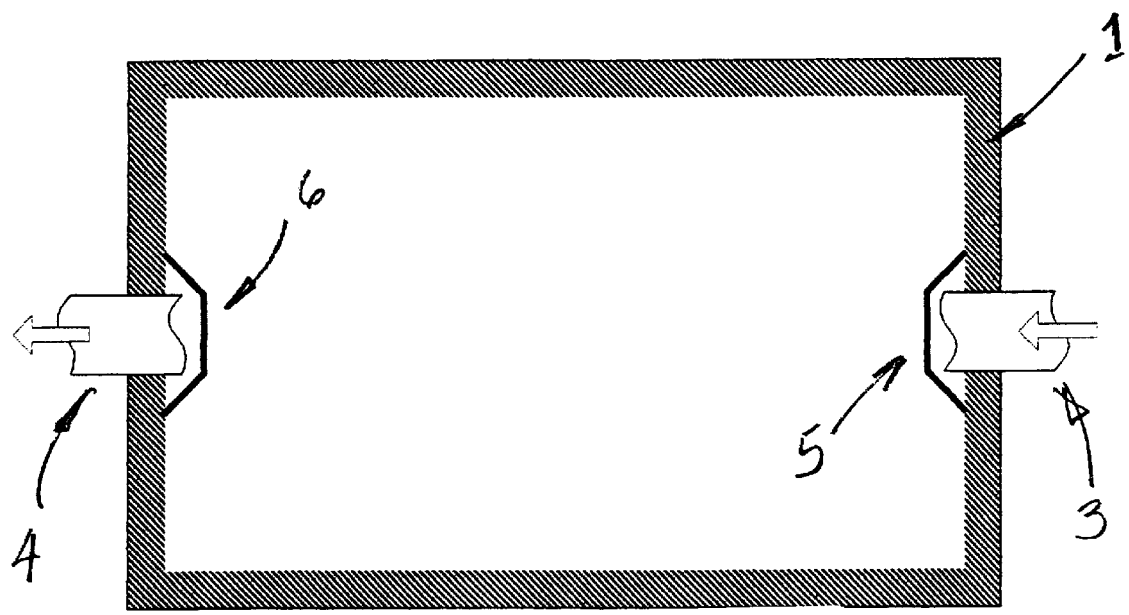
FIG. 5 (Prior Art) depicts a plan view of a septic tank showing the baffles, inlet, and outlet.

The operation of the baffles can be understood by referring to FIGS. 1 and 5, which depict an elevation view and a plan view of the septic tank.

In the following section, the reference numbers in the following table may be of help in interpreting the operation of the preferred embodiments.

| element | description |
| --- | --- |
| 1 | Septic Tank casing |
| 2 | access port |
| 3 | inlet |
| 4 | outlet |
| 5 | inlet baffle |

-continued

| element | description |
|---|---|
| 6 | outlet baffle |
| 7 | liquid layer |
| 8 | sedimentation layer |
| 9 | cake layer |
| 10 | in-tank unit |
| 11 | Signal Interpretation module |
| 12 | cable |
| 13 | active sonar unit |
| 14 | signal conditioner |
| 16 | sound waves |
| 17 | cable seal |
| 18 | sensor orientation weights |
| 22 | (DSP) module |
| 25 | input/output (IO) panel |
| 26 | keypad |
| 27 | alpha-numeric display |
| 28 | LED indicators |
| 29 | audio alarm |
| 30 | interface port |
| 31 | signal interpretation module enclosure |
| 32 | AC power cable |
| 34 | central processing unit (CPU) |
| 36 | power supply |
| 40 | START |
| 41 | sense keyboard |
| 42 | Any User Input? |
| 43 | Keyboard Input |
| 44 | User Input Processing |
| 45 | Stored Tank Parameters |
| 46 | Sensor Input |
| 47 | Calculate Interface Distances |
| 48 | Update Tank Outlet Elevation |
| 49 | Initial Filling? |
| 50 | Sensor Elevation Stable? |
| 51 | Evaluate Tank Capacity Metrics |
| 52 | Pumping Required? |
| 53 | Calculate Warning Level |
| 54 | Present Pump Warning |
| 55 | Update Percent Full Display |

The present invention, which relates to an improved septic system, may be understood by first reviewing the operation of a conventional septic system. Referring first to FIG. 1, which depicts a septic tank 1 of conventional size and shape, the septic tank itself provides an access port 2 used for pumping and other maintenance, and located at the upper part of the tank. The conventional septic tank also has an inlet 3 and an outlet 4. The inlet is conventionally protected by an inlet baffle 5, while the outlet is likewise protected by an outlet baffle. The baffles serve to isolate the inlets and outlets from the top and bottom layers of material that form during the normal course of operation of the septic tank. A plan view of the septic system, showing the baffles, is also shown in FIG. 5. Some tanks use alternatives to baffles such as "tee" pipe connections which perform the same function as the baffles, keeping the sediment and cake from flowing out of the septic system while the system still maintains system capacity. The current invention is equally applicable in the case of these alternative designs.

FIG. 1 also shows the formation of the three layers typical of conventional septic tanks: the liquid layer 7, the "scum", or "cake" layer 9, and the sedimentation or sludge layer 8.

During the normal course of operation of the convention septic tank, waste water enters the tank at inlet 3 and remains in the tank for a period of time that is a direct function of the size of the liquid layer 7 and the waste stream input flow rate. During this period of time, known as the retention time, suspended solids in the liquid layer migrate towards the top and the bottom of the tank resulting in the formation of the sedimentation layer 8 and a floating cake layer 9. Over time the thickness of both the bottom and the top layers increases. This, in turn, decreases thickness of the middle layer and thereby reduces the retention time. The reduction of retention time, in turn, reduces the settlement efficiency of the tank. When the middle layer 7 constitutes about ⅓ of the volume of material contained in the tank, it is common practice to recommend that the septic tank be pumped to remove all undissolved solids. If the tank is not pumped, eventually the middle layer will be reduced to such an extent that either 1) the inlet is clogged resulting in a backup of sanitary waste such that toilets and other waste sources no longer function or 2) suspended solids exit the septic tank into the drainage field in volume. These events typically do not occur simultaneously; the most common failure mode is the invisible one, where solids begin to enter the drainage field. Either condition is extremely serious and calls for immediate action on the part of the system operator. In most cases the primary component of the tank will be the lower sedimentation layer 8 at the time the tank needs to be pumped. In rare cases, the volume of the cake will dominate.

The present invention includes a transponder contained within the septic system to detect the extent of the various layers, and to transmit related information to a remote computation and display system external to the septic tank.

In the preferred embodiment of the invention, the in-tank unit 10, containing a sonar transponder—floats at the top of the uppermost layer of material in the tank. This transponder within this unit periodically emits a sound pulse directed downward. It is well known that changes in fluid density will cause such sound waves to reflect back toward their source. Thus the sound energy is reflected, to varying degrees, by each of the layers of material below the sensor. The time delay experienced by a sound wave is a function of the distance traveled, as well as the speed of sound of the wave in the particular medium. As a result, the transponder may calculate the distance to each layer a function of the time delay of the returning sound waves. The waves are generally encoded in pulses to facilitate time delay measurements. This technology, first developed in conjunction with submarine anti-warfare technology, has been developed to the point where it is used in many common domestic applications, such as fish finders used by recreational and commercial fishermen.

The reflected sound energy is detected by the transponder and is then converted into electrical signals which are sent back to a signal interpretation module 11 via cable 12.

Figure 2:
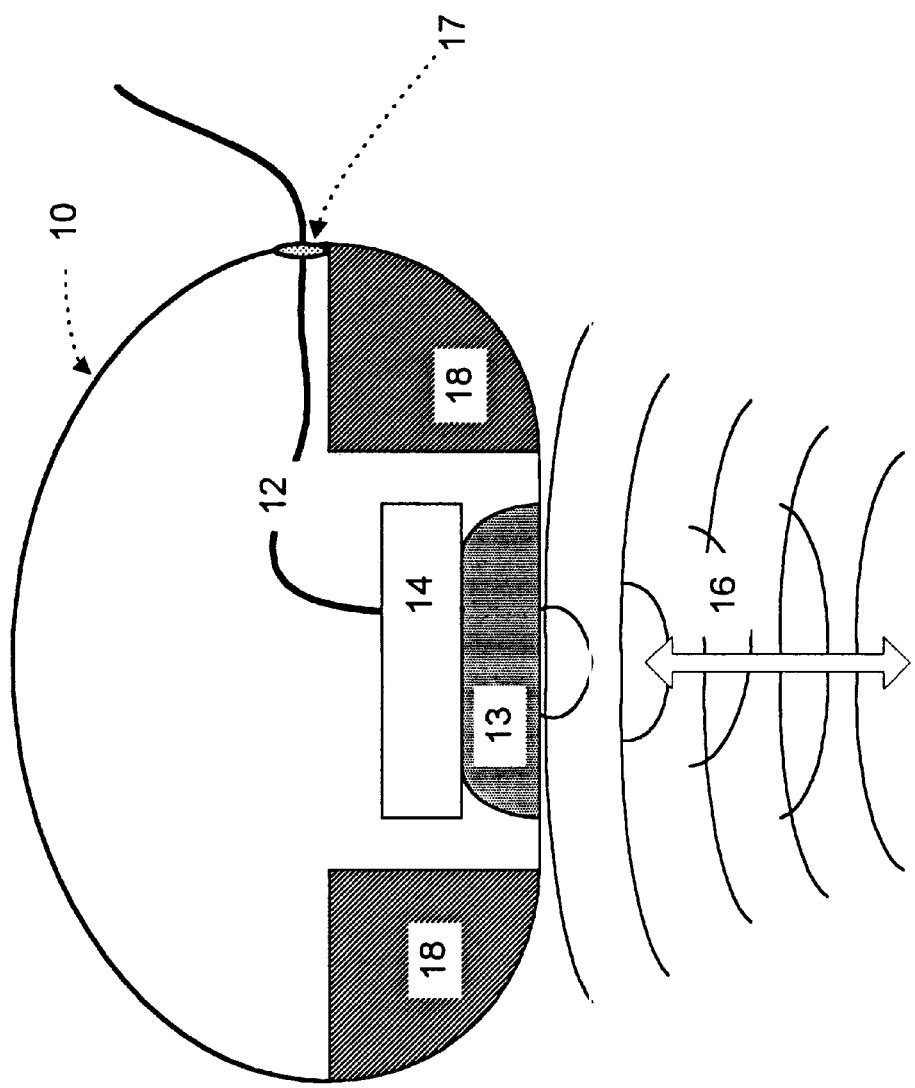
FIG. 2 depicts a detailed drawing of the septic sensing assembly.

Referring now to FIG. 2, the preferred embodiment of the in-tank unit 10 is shown. This external enclosure of this unit is constructed of high-impact plastic and is hermetically sealed to withstand the environment within the septic tank. The geometric shape of in-tank unit 10 in conjunction with the low center of mass guaranteed by the placement of weights 18 near the bottom of the unit guarantees a single stable orientation for the unit. The transponder in the preferred embodiment is of the type which generates a directional sound wave, and the sound waves in the current invention are directed downward toward the bottom of the tank. The preferred embodiment of the in-tank unit includes a commercial sonar sensor transponder 13 and an electronic component package 14 to condition the signal for transmission over a distance of up to 100 meters. The sonar transponder both transmits the sound waves and detects their return.

The sensor assembly is connected to the signal interpretation module 11 via cable 12. This cable is designed to allow for direct burial. In addition, the portion of the cable that is within the septic tank itself is reinforced to allow it safely support the weight of the sensor assembly.

Figure 3:
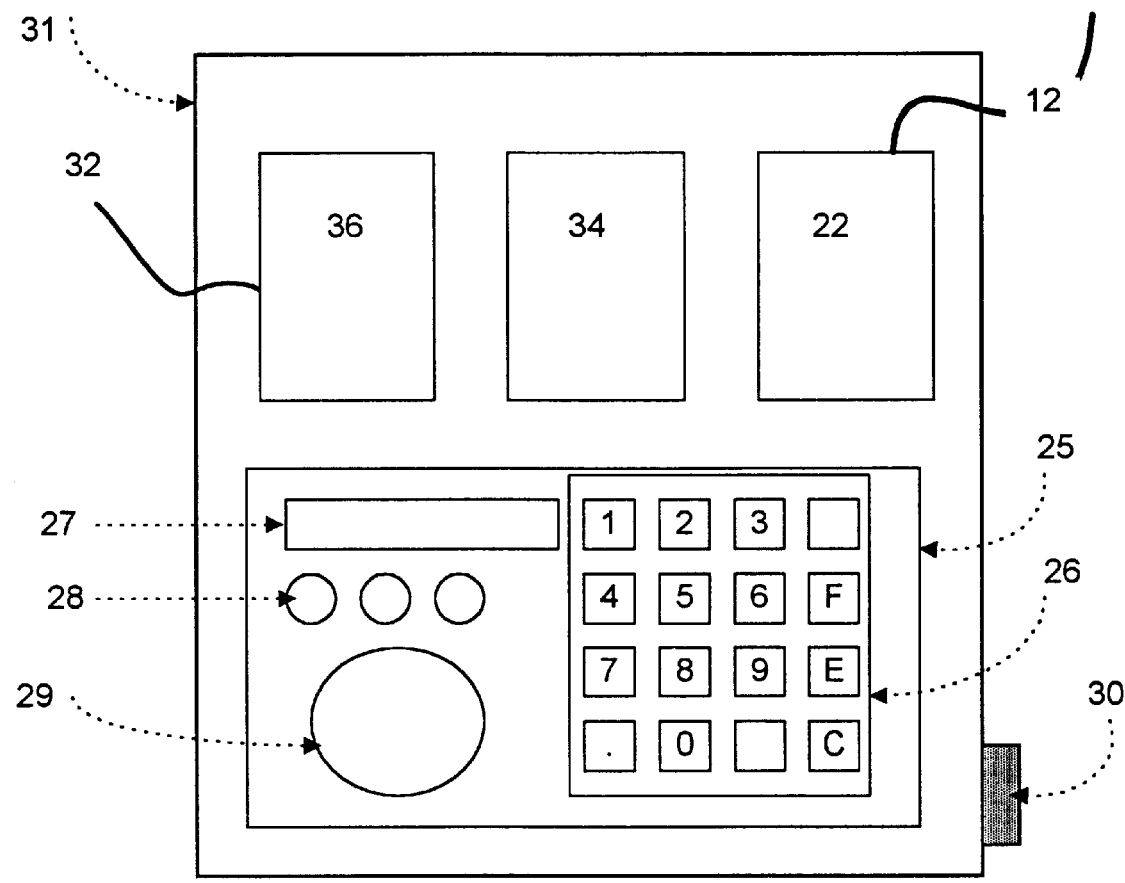
FIG. 3 depicts a top-level design of the signal interpretation module, consisting of a embedded systems computer attached to a digital signal process unit and a user IO module.

FIG. 3 depicts the signal interpretation module, which is located in a convenient indoor location, often at a considerable distance from the septic tank itself. All of the signal interpretation components are housed with a single enclosure 31 constructed of a suitable material such as sheet metal or plastic. The signal interpretation module consists of a digital signal processing (DSP) module 22 which evaluates "raw" signals returned from the sonar transponder and converts these signals to a series of distance measurements from the transponder. Signals enter the DSP module via the cable 12 that is connected to the in-tank unit. The DSP module presents digital signals to a general purpose, low-cost, central processing unit (CPU) 34. The CPU interprets the distance measurements to determine the volumes of the tank components and for evaluating the location of the bottom of the top layer and the top of the bottom layer relative to the septic tank baffles. The CPU is also responsible for controlling the user input/output (IO) panel 25. The preferred embodiment of the invention includes a keypad 26 for entering key parameters including, but not necessarily limited to: 1) height of the bottom of the inlet baffle, 2) height of the bottom of the outlet baffle, 2) capacity percentage—the thickness of the central material layer in the tank as a percentage of the total depth where the tank is to be considered at its carrying capacity for undissolved solids. The preferred embodiment also includes an alpha-numeric display 27 that provides continual feedback as to "percentage full" and optional feedback predicting days remaining until pumping is required. The preferred embodiment also includes a set of three color-coded light emitting diode indicators 28 that indicate 1) no action is required, 2) pumping should be scheduled soon, 3) immediate pumping is required. In addition, the preferred embodiment includes an audio alarm 29 to signal both the level (2) alter and the level (3) alert indicated above. The audio alert is accompanied by a "silence" button to turn the alarm off (not shown). The preferred embodiment of the invention also includes an interface port 30 for connecting the system to external monitoring equipment such as personal computers (PC's), home alarm systems and "smart building" systems. The preferred embodiment of the invention includes an integrated power supply of conventional design 36 suitable for powering the electronic components and the sonar transponder. An alternative embodiment incorporates the use of power supply external to the signal interpretation module. An additional alternative embodiment merges the DSP 22 and the CPU 34 modules into a single integrated module.

Figure 4:
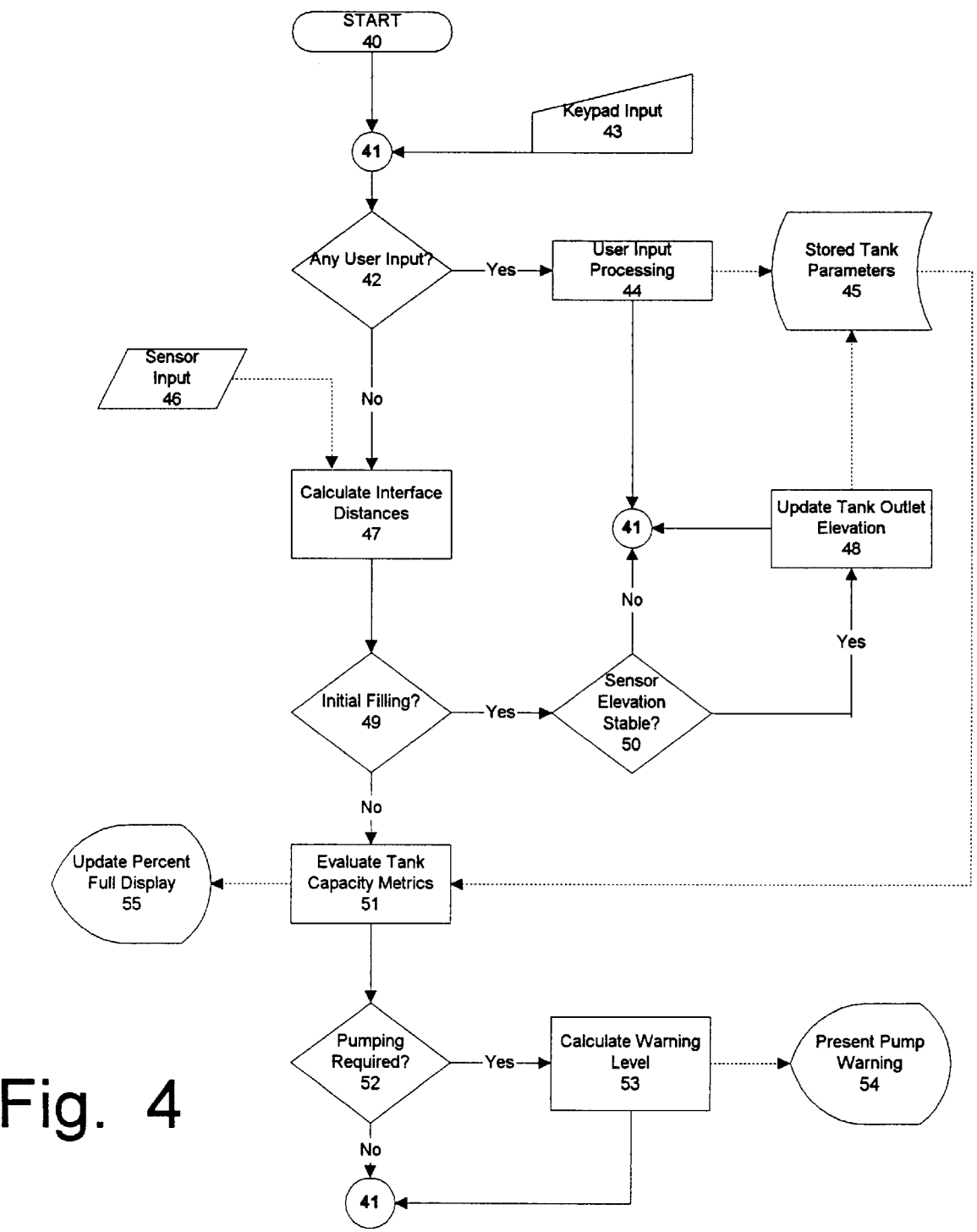
FIG. 4 depicts a flowchart for the control software executed by the signal interpretation module.

FIG. 4 depicts a flowchart for the control software which resides in the Signal Interpretation Module. The software will run in a monitor loop characterized by the return to state 41 in the flowchart after each significant operation. A decision is then made based on whether any user keypad input is pending. If such input is pending process the input and store the results internally. If no such input is pending then control proceeds to read the sensor input 46. If user input is pending, then stored tank parameters are input 45.

If no user input is sensed, control proceeds to the Calculate Interface Distances operation 47, which calculates these distances based on the digitally signal processed inputs of the DSP module 22. The outcome of this operation is a series of distance measurements from the sensor head to the various interfaces below it including the top of the sludge and the bottom of the tank. Control next passes to The Initial Filling decision 49, which is based on whether the elevation of the sensor head has stopped increasing rapidly indicating that gray water has started to flow out of the tank. Initial filling indicates that either the tank has never been used before, or that it has just been pumped out. When the initial outflow of gray water is first detected, the elevation of the sensor is stored for future reference. If the system is not in the initial filling state, then control proceeds to evaluate the tank capacity metrics 51, and to update the display 55 to reflect the tanks current percentage full. (The tank is said to be full when it has reached its system capacity for undissolved solids, indicating pumping is required.)

The tank capacity metrics evaluation consists of determining the distances between the various layer interfaces: the sediment, gray water, and cake. The distances to the tank bottom, and the levels of the inlet and outlet are also taken into account.

After updating the display, a decision is made as to whether the operator should be warned of an imminent need to pump the tank 52, or if there is not an immediate need to pump the tank, whether an alternative level of warning should nevertheless be issued. If not, then the system returns to the keyboard sense state 41. Otherwise, the warning level is calculated 53, and the present pump warning 54 is activated, illuminating one of the LEDs 28 on the control panel 31, shown in FIG. 3.

If the system was in the initial filling state 49, then the elevation stability of the sensor is checked 50, and if unstable, the system returns to test the keyboard input state 41. In the case of stable sensor elevation, the tank outlet elevation is updated 48, the stored tank parameters are updated 45, and control proceeds to module 51, Evaluate Tank Capacity Metrics.

The preferred embodiment of the control algorithms for the invention will allow the invention to be used effectively without requiring any configuration on the part of the septic system operator. If the operator elects to configure the system by entering parameters such as baffle heights, then the invention will be able to provide an improved level of emergency warning. The control algorithm will be such that temporary variations in elevations are ignored. The display will be based on a running average captured over a several hour period.

The primary intent of this invention is to facilitate the monitoring amount of undissolved solid material in the tank; however it is also expected that this invention could be used to detect undesirable changes in the nature of the biological activity in the tank. Undesirable activity, as characterized by the death of waste digesting microorganisms, would be signaled by an increase in the rate of material deposition. This increased rate could be easily detected by the control software. It is also foreseen that the invention may be able to directly monitor the amount of suspended solids in the liquid layer by measuring the speed of sound waves through this layer. Direct measurement of the suspended solids would be facilitated by the addition of a temperature sensor to the sensor assembly 10.

In alternative embodiments of the invention the sensor assembly floats at the interface between the cake 9 and the fluid layer 7, as seen in FIG. 1. This alternative embodiment would allow for an estimate the thickness of the cake based on the known outlet height. In alternative embodiments the sonar sensor is attached directly to the bottom of the access port in conjunction with sufficiently powerful sensing technologies (i.e. both the transponder and the signal processing) employed. In the preferred embodiment of the invention the cable will enter the tank via the access port used for pumping. In some cases, field modifications to the access port may be required to enable the wiring to pass into the tank once the access port in place. In alternative embodiments, the sonar sensor is tethered so that it is located at a fixed location within the liquid layer. This particular alternative embodiment would involve two sonar transducers: one directed upward, and the other downward. Other anticipated embodiments of the invention may provide alternative means of routing the cable into the tank.

The preferred embodiment of this invention incorporates a cable to connect the sensor in the tank to the signal interpretation module. Alternative implementations might include placing the signal interpretation module in an outdoor and environmentally hardened enclosure in the immediate vicinity of the septic tank, or using radio frequency (RF) communications so as to avoid the need to bury a cable between the signal interpretation module and the tank.

Alternative embodiments may provide for either fewer or additional electronic elements in the sensor assembly itself.

The primary intent of this invention is to facilitate the monitoring amount of undissolved solid material in the tank; however we also anticipate that this invention could be used to detect undesirable changes in the nature of the biological activity in the tank. Undesirable activity, as characterized by the death of waste digesting microorganisms, would be signaled by an increase in the rate of material deposition. This increased rate could be easily detected by the control software.

It will be apparent that improvements and modifications may be made within the purview of the invention without departing from the scope of the invention defined in the appended claims.

We claim:

1. A method for monitoring the status of a septic system which includes a tank, having a bottom, an inlet, and an outlet, wherein the tank contains three levels of material, consisting of an essentially solid sediment level, a liquid level above the sediment level, and an essentially solid cake level above the liquid level, comprising:

sensing the location of the bottom of the septic tank;

sensing the location of the boundary between the sediment level and the liquid level;

sensing the location of the boundary between the liquid level and the cake level;

calculating the status of the septic system as a function of said locations; and outputting said status remotely from the tank.

2. The method of claim 1, further comprising:

inputting and storing the dimensions of the tank; and inputting and storing the locations of the inlet and outlet.

3. The method of claim 1, wherein the calculating of the septic system status, and the inputting and storing of the dimensions of the tank and the locations of the inlet and outlet are performed by a computer.

4. The method of claim 3, wherein both the sensing of the boundary between the sediment level and the liquid level, and the sensing the location of the boundary between the liquid level and the cake level, further comprise sensing by means of a sonar transducer located within the tank.

5. The method of claim 4, wherein the calculating of status further comprises calculation of a condition when the liquid level is one-third or less of the sum of the three levels.

6. The method of claim 4, wherein the calculating of status further comprises calculation of condition when the cake layer reaches a particular thickness.

7. The method of claim 4, wherein the calculating of status further comprises calculation of a condition when the sediment layer reaches or exceeds the level of the inlet or outlet.

8. The method of claim 4, wherein the calculating of status further comprises calculation of a condition when the thickness of the sediment layer plus that of the cake year reaches a particular amount.

9. The method of claim 4, wherein the sensing of the locations of the boundaries is continuous.

10. The method of claim 4, further comprising performing the following steps, in order, by a computer program located within the computer:

a) constantly testing for keypad input;

b) if keyboard input is sensed, testing for user input;

c) if user input is sensed:

d) performing user input processing; and e) storing tank parameters, f) if user input is not sensed, then evaluating tank capacity metrics, and updating "Percent Full" display, followed by detecting whether pumping is required;

g) if pumping is required, calculating warning level, and presenting a pump warning;

h) if no user input was sensed in b), then calculating interface distances, based on inputs from the interface distance sensor;

i) testing if the current case is an initial filling;

j) if the previous answer was yes, then testing if the distance sensor had a stable elevation;

k) if the previous answer was yes, then updating the tank outlet elevation, and storing the tank parameters;

l) if the answer of i) was no, then passing control to step f).

11. An apparatus for monitoring the status of a septic system which includes a tank, having a bottom, an inlet, and an outlet, wherein the tank contains three levels of material, consisting of an essentially solid sediment level, a liquid level above the sediment level, and an essentially solid cake level above the liquid level, comprising:

means to input and store the dimensions of the tank;

means to input and store the locations of the inlet and outlet;

means for sensing the location of the bottom of the septic tank;

means for sensing the location of the boundary between the sediment level and the liquid level;

means for sensing the location of the boundary between the liquid level and the cake level;

means for calculating the status of the septic system as a function of said locations; and means for outputting said status remotely from the tank.

12. The apparatus of claim 11, wherein:

the means to input and store the dimensions of the tank, means to input and store the locations of the inlet and outlet, and means for calculating the status of the septic system comprise a computer; and the means for sensing the location of the bottom of the septic tank, means for sensing the location of the boundary between the sediment level and the liquid level, and means for sensing the location of the boundary between the liquid level and the cake level comprise a sonar transducer.

13. The apparatus of claim 12, wherein the means for calculating the status of the septic system further comprises a computer program which calculates a warning signal when the liquid level is one-third or less of the sum of the three levels.

14. The apparatus of claim 12, wherein the means for calculating the status of the septic system further comprises a computer program which calculates a warning signal when the cake layer reaches a particular thickness.

15. The apparatus of claim 12, wherein the means for calculating the status of the septic system further comprises a computer program which calculates a warning signal when the sediment layer reaches or exceeds the level of the inlet or outlet.

16. The apparatus of claim 12, wherein the means for calculating the status of the septic system further comprises a computer program which calculates a warning signal when the thickness of the sediment layer plus that of the cake year reaches a particular amount.

* * * * *